(12) United States Patent
Campen

(10) Patent No.: US 7,110,753 B2
(45) Date of Patent: Sep. 19, 2006

(54) REMOTELY CONTROLLABLE WIRELESS DEVICE

(75) Inventor: Kenneth Brian Campen, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 397 days.

(21) Appl. No.: 10/255,997

(22) Filed: Sep. 26, 2002

(65) Prior Publication Data

US 2004/0198335 A1 Oct. 7, 2004

(51) Int. Cl.
 *H04M 3/00* (2006.01)
(52) U.S. Cl. .................................... 455/419; 455/414.1
(58) Field of Classification Search ............. 455/414.1, 455/418–420, 456.1–456.6, 466, 565, 410, 455/411, 433, 432.1, 435.1, 414.2, 550.1, 455/404.1
 See application file for complete search history.

(56) References Cited

U.S. PATENT DOCUMENTS

| | | | |
|---|---|---|---|
| 4,794,642 A | 12/1988 | Arbabzadah et al. | |
| 4,908,848 A * | 3/1990 | Hanawa | 455/565 |
| 5,200,995 A | 4/1993 | Gaukel et al. | |
| 5,214,789 A * | 5/1993 | George | 455/440 |
| 5,487,108 A | 1/1996 | Atkins et al. | |
| 5,765,108 A * | 6/1998 | Martin et al. | 455/422.1 |
| 5,839,067 A * | 11/1998 | Jonsson | 455/432.3 |
| 5,864,613 A | 1/1999 | Flood | |
| 5,884,193 A * | 3/1999 | Kaplan | 455/565 |
| 5,926,756 A | 7/1999 | Piosenka et al. | |
| 6,021,331 A * | 2/2000 | Cooper et al. | 455/507 |
| 6,061,571 A | 5/2000 | Tamura | |
| 6,167,257 A | 12/2000 | Lahdemaki | |
| 6,169,790 B1 * | 1/2001 | Flon | 379/112.01 |
| 6,246,756 B1 | 6/2001 | Borland et al. | |
| 6,255,966 B1 | 7/2001 | Siegmund et al. | |
| 6,256,515 B1 * | 7/2001 | Cox et al. | 455/565 |
| 6,269,254 B1 * | 7/2001 | Mathis | 455/557 |
| 6,301,484 B1 | 10/2001 | Rogers et al. | |
| 6,311,055 B1 * | 10/2001 | Boltz | 455/414.1 |
| 6,351,639 B1 | 2/2002 | Motohashi | |
| 6,393,297 B1 | 5/2002 | Song | |
| 6,418,310 B1 * | 7/2002 | Dent | 455/418 |
| 6,564,047 B1 * | 5/2003 | Steele et al. | 455/405 |
| 2002/0045442 A1 * | 4/2002 | Silen et al. | 455/420 |
| 2002/0061744 A1 | 5/2002 | Hamalainen et al. | |
| 2002/0083160 A1 * | 6/2002 | Middleton | 709/221 |
| 2002/0094777 A1 * | 7/2002 | Cannon et al. | 455/41 |
| 2002/0115433 A1 | 8/2002 | Baker | |
| 2003/0078032 A1 * | 4/2003 | Pei et al. | 455/411 |
| 2003/0217023 A1 * | 11/2003 | Cui et al. | 706/45 |
| 2004/0098669 A1 * | 5/2004 | Sauvage et al. | 715/513 |
| 2004/0203941 A1 * | 10/2004 | Kaplan et al. | 455/466 |

OTHER PUBLICATIONS

Parental Controls from America Online Sep. 17, 2002 downloaded information, 1 page total.

* cited by examiner

*Primary Examiner*—Charles N. Appiah

(57) ABSTRACT

The present invention is directed to a system and method for remotely controlling functional aspects of a wireless device. An administrator may create control parameters regarding use of a remote wireless device. Upon transmission from the administrator, the control parameters may be received by a recipient wireless device. The wireless device of the present invention may include a program of instructions controlling the operation of the wireless device. When control parameters are received from an administrator, the control parameters may be integrated within the program of instructions such that the recipient wireless device operates according to the control parameters.

26 Claims, 3 Drawing Sheets

REMOTELY CONTROLLABLE WIRELESS DEVICE

BACKGROUND OF THE INVENTION

The present invention relates generally to wireless devices, and particularly to a method and system for remotely controlling use of a wireless device.

Mobile communication is rapidly increasing in popularity by providing an ability to access data, transfer information and speak with others from remote locations. Thus, an incentive exists for the industry to provide wireless devices such as cellular telephones, pagers and personal digital assistants to those people for whom wireless communication may be beneficial. In some instances, use of a wireless device may be inappropriate. For example, employees that receive a wireless device from an employer may utilize the wireless device for personal use. Additionally, a child may be provided with a wireless device to contact his or her parents, however expensive usage charges may result when the child utilizes the wireless device for other purposes. As wireless device functionalities (including the incorporation of MP3 players, games, and the like) increase, the need for control of wireless devices becomes even greater.

Conventional wireless devices may include an ability to enable features that may be desirable by the user. For example, a user of a cellular phone may disable a ringing function when incoming calls are received in favor of a vibrating alert. A personal digital assistant may block incoming electronic messages (emails) from a particular user. However, features that are controlled by the user do not prevent misuse of a wireless device. Consequently, it would be advantageous if an administrator could remotely enforce functional constraints upon a wireless device to prevent certain unauthorized use(s) of a wireless device. Therefore, it would be desirable to provide a system and method for remotely controlling functional aspects of a wireless device.

SUMMARY OF THE INVENTION

Accordingly, the present invention is directed to a system and method for remotely controlling functional aspects of a wireless device. In an embodiment of the invention, an administrator may create control parameters regarding use of a remote wireless device. Control parameters may be transmitted from the administrator to a recipient wireless such that the wireless device operates according to the control parameters.

In a second embodiment of the invention, the present invention may be directed to a wireless device capable of being controlled by an administrator. The wireless device of the present invention may include a program of instructions controlling the operation of the wireless device. When control parameters are received from an administrator, the control parameters may be recovered from the transmission and integrated within the program of instructions such that the recipient wireless device operates according to the control parameters.

It is to be understood that both the foregoing general description and the following detailed description are exemplary and explanatory only and are not necessarily restrictive of the invention claimed. The accompanying drawings, which are incorporated in and constitute a part of the specification, illustrate an embodiment of the invention and together with the general description, serve to explain the principles of the invention.

DETAILED DESCRIPTION OF THE SPECIFIC EMBODIMENTS

Reference will now be made in detail to the presently preferred embodiments of the invention, examples of which are illustrated in the accompanying drawings.

Figure 1:
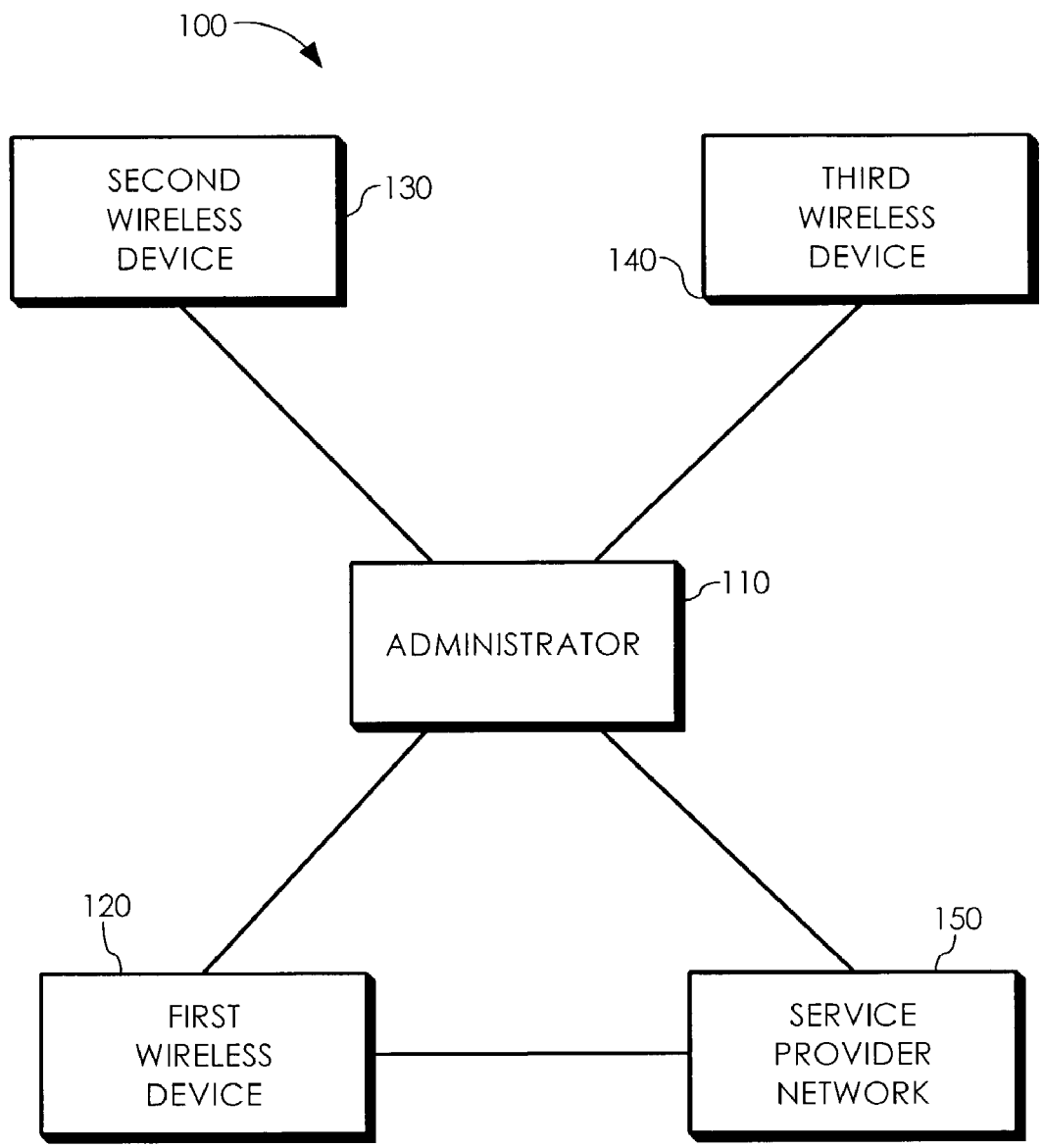
FIG. 1 is an illustration depicting an embodiment of a system of the present invention wherein an administrator may remotely control a plurality of wireless devices via an operable wireless connection.
Figure 2:
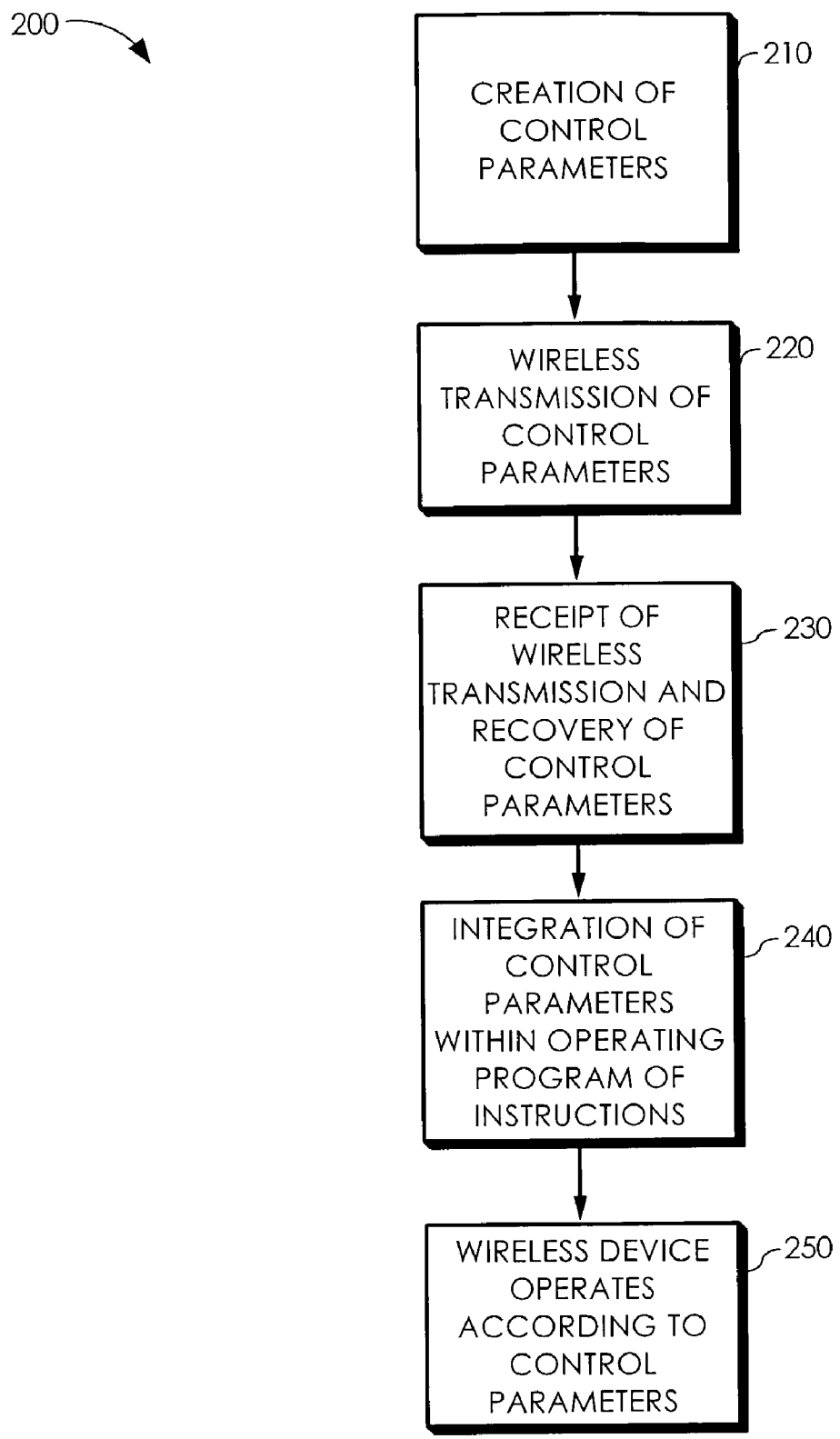
FIG. 2 is a flow diagram illustrating an exemplary method of the present invention for remotely controlling a functionality of a wireless device.
Figure 3:
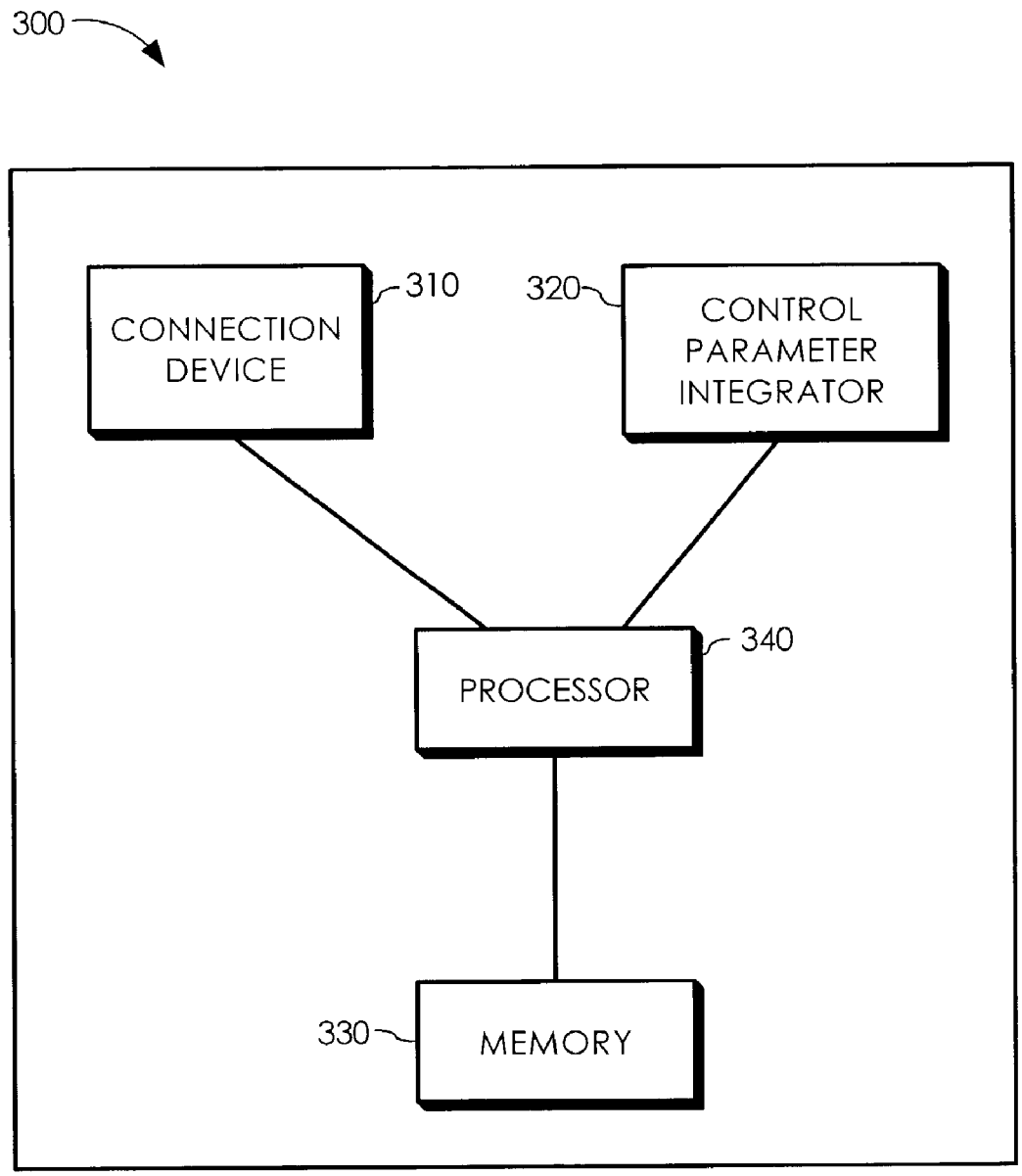
FIG. 3 is a block diagram depicting a wireless device in accordance with an embodiment of the present invention.

Referring generally now to FIGS. 1 through 3, exemplary embodiments of the present invention are shown. According to the invention, the operational functionality of a wireless device may be remotely controlled by an administrator. Control parameters may be created by the administrator and transmitted to desired wireless devices. Control parameters may be recovered from the transmission and integrated within the operating program of instructions of the wireless device such that the wireless device operates according to the control parameters.

Referring now to FIG. 1, an illustration depicting an embodiment of a system 100 of the present invention wherein an administrator may remotely control a plurality of wireless devices via an operable wireless connection is shown. Administrator 110 may refer to a device that may access and control wireless devices 120–140. For example, administrator 110 may be a personal computer capable of accessing a world-wide network such as the Internet, a personal digital assistant with wireless communication ability, a cellular telephone, and the like. Wireless device 120–140 may also refer to a personal digital assistant, pager, cellular phone and the like.

In an embodiment of the invention, administrator 110 may refer to a device within an administrative control group. An administrative control group may be formed by granting a user an ability to utilize an administrator 110 to control a plurality of wireless devices that may be included and registered within the administrative control group. An administrator 110 may be capable of gaining control of registered wireless devices of an administrative control group through a configurable password. This may be advantageous as a particular user may be designated as an administrator for an administrative control group. For example, a parent or an employer may be designated as the administrator 110 and may control registered wireless devices provided to children and employees respectively. In an embodiment of the invention, control of wireless devices 120–140 may be accomplished when a user utilizes an administrator 110 such as a personal computer, personal digital assistant or a cellular phone gains access to the administrative control group through a configurable password or other administrative identification authorization.

When a wireless device 120–140 of the present invention is provided to an employee, child or the like, it may be registered within an administrative control group. Registration of the wireless device 120–140 may include providing model and device specific information, such as the telephone number of a cellular phone. Additionally, model and device information may include an identifier for email, an IP address, wireless links such as Bluetooth, IEEE 802.11 and the like. As a result, an administrator 110 may be capable of remotely controlling a wireless device 120–140 by transmitting control parameters to the wireless device 120–140, without the necessity or support from a service provider. Unauthorized control parameter changes may be prevented by including an authentication identifier with the transmission from the administrator 110 to the wireless devices 120–140. The wireless device 120–140 may prevent unauthorized control parameter changes by only allowing integration of the control parameters when the transmission includes an encrypted authentication identifier, encrypted messages with keys, random number usage, encrypted random handshake and the like.

When control parameters are received and integrated, control of the operating functionality of a wireless device 120–140 may be accomplished. For example, in the case of where the wireless device is a phone, an administrator 110 may limit what phone numbers may be called and/or received and may limit the duration of phone calls to and/or from particular numbers to reduce air-time. In the case where the wireless device refers to a personal digital assistant, certain applications may be disabled and/or certain content that may be available through access to the Internet may be blocked.

While control of a wireless device may be granted in accordance with the present invention without the support of a similar service provider 150, when an administrator and wireless device 120 are utilizing the same service provider or cooperating service providers, additional functional controls may be implemented. For example, an administrator 110 may be capable of gaining access to telephone conversations. Other types of features may also be employed through the use of an administrative control network of the present invention in combination with a service provider network 150 without departing from the scope and spirit of the present invention.

Referring now to FIG. 2, a flow diagram illustrating an exemplary method 200 of the present invention for remotely controlling a functionality of a wireless device is shown. Method 200 may begin upon the creation of control parameters 210. This may be implemented when an administrator user with restricted access creates control parameters on an administrator device 110 of FIG. 1. Control parameters may refer to functional limits on the use of a wireless device. Consequently, the transfer of software code or instructions that may require compiling is not necessary, rather, control parameters may refer to object variables that may be easily integrated into the wireless device's existing operating program of instructions.

The control parameters may be transmitted to a desired wireless device, preferably through a wireless transmission 220. The intended wireless device may receive the wireless transmission and recover the control parameters 230. Additionally, the wireless device may detect whether the transmission includes an authentication identifier. If the proper authentication identifier is not present within the transmission, the control parameters may not be integrated. This is advantageous as it may prevent unauthorized modification of control parameters.

Since the control parameters may be in the form of object variables, the control parameters may be integrated with the operating program of instructions of the wireless device 240. After integration of the control parameters, the wireless device may operate according to the control parameters.

An advantageous aspect of the method 200 of the present invention is the use of control parameters rather than software. The transmission of control parameters is more efficient since the amount of data required for control parameters is significantly less than an amount required for software. Additionally, transmission of software includes a compiling step that is not necessary in the transmission of control parameters. Also, the integration of control parameters within existing software requires less processing and hence utilizes less power for longer wireless device battery life.

Referring now to FIG. 3, a block diagram depicting a wireless device 300 in accordance with an embodiment of the present invention is shown. Wireless device 300 may be representative of wireless devices 120–140 of FIG. 1 capable of being remotely controlled. Wireless device 300 may include a connection device 310, a control parameter integrator 320, memory 330 and a processor 340. Connection device 310 may include an antenna, a transceiver and an analog to digital/digital to analog converter.

In an embodiment of the invention, connection device 310 may be capable of receiving a wireless transmission that may include control parameters. The wireless transmission may be in the form of a text message such as a Short Message Service (SMS) message, an electronic mail, a wireless application protocol (WAP) download, or local wireless link for example Bluetooth, IEEE 802.11 or infrared. When sending a control parameter transmission, a code word, identifier and the like may be included with the transmission such that the connection device 310 may initially recognize that the wireless transmission includes at least one control parameter. Additionally, connection device 310 may be capable of deciphering whether control parameter was sent from an authorized administrator by detecting an authentication identifier. Upon receipt of a wireless transmission including at least one control parameter, at least one control parameter may be extracted from the wireless transmission.

Since control parameters refer to variables and are not code themselves, they may be integrated into a wireless device's operating program of instructions. Control parameter integrator 340 may integrate the control parameters into the operating program of instructions that are stored within memory 350. Once the control parameters have been integrated, the operating program of instructions may execute operations in accordance with the control parameters.

In one embodiment of the invention, wireless device 300 may include an embedded computer program applet such as Java. Control parameters sent by an administrator to wireless device 300 may be Java control instructions which may be incorporated within a Java applet such that applet executes steps in accordance with the Java control instructions. It should be understood by those with ordinary skill in the art that other types of programming languages may be utilized to provide similar functionality without departing from the scope and spirit of the present invention.

In exemplary embodiments of the invention, the creation and incorporation of control parameters within a wireless device may provide restrictions for use by a user. This may prevent unauthorized use of a device while allowing operation for its intended use. Specific examples of controls that may be implemented include call duration limitations, limited outgoing calling, limited incoming calls, releasing of calls, generation of a log of calls, restricted content access and restricted message receipt. Additionally, multiple wireless devices within an administrative control network may operate according to a unique set of control parameters.

In an embodiment of the invention, the present invention may be incorporated with device location capabilities. For example, the administrator may create control parameters to force the wireless device to notify the administrator of the wireless device's current location. Additionally, the device may be disabled when the device is outside a particular area or region, or alternatively, a message or alert may be sent to the administrator when a boundary has been crossed. Device location capability may be provided utilizing geographic positioning system (GPS) technology or cell tower signal receipt technology. Other types of device location capability known to the art may also be utilized in accordance with the present invention without departing from the scope and spirit of the present invention.

Although the invention has been described with a certain degree of particularity, it should be recognized that elements thereof may be altered by persons skilled in the art without departing from the scope and spirit of the invention. It is understood that the specific orders or hierarchies of steps in the methods illustrated are examples of exemplary approaches. Based upon design preferences, it is understood that the specific orders or hierarchies of these methods can be rearranged while remaining within the scope of the present invention. The accompanying method claims present elements of the various steps of methods in a sample order, and are not necessarily meant to be limited to the specific order or hierarchy presented.

It is believed that the scope of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for remotely controlling a wireless device by an administrator, comprising:
    (a) creating at least one control parameter relating to a function of a wireless device, said at least one control parameter including a geographic location restriction whereby the wireless device notifies the administrator regarding a location of the wireless device, said at least one control parameter being an object variable;
    (b) transmitting said at least one control parameter to said wireless device; and
    (c) integrating said at least one control parameter within a program of instructions controlling said wireless device, wherein said at least one control parameter is integrated within the program of instructions without compiling the at least one control parameter and said wireless device operates according to said at least one control parameter.

2. The method as described in claim 1, wherein said wireless device is registered within an administrative control group.

3. The method as described in claim 2, wherein said at least one control parameter is transmitted with an authentication identifier of said administrator.

4. The method as claimed in claim 3, wherein said at least one control parameter is transmitted via a wireless transmission.

5. The method as described in claim 4, wherein said wireless transmission is at least one of a wireless link, electronic mail transmission, and text messaging transmission.

6. The method as described in claim 1, wherein said at least one control parameter includes at least one of call duration limitation, outgoing calling limitation, incoming call limitation, content access limitation, and message receipt limitation.

7. A system for remotely controlling a wireless device by an administrator, comprising:
    (a) means for creating at least one control parameter relating to a function of a wireless device, said at least one control parameter being an object variable;
    (b) means for transmitting said at least one control parameter to said wireless device; and
    (c) means for integrating said at least one control parameter within a program of instructions controlling said wireless device, wherein said at least one control parameter is integrated within the program of instructions without compiling the at least one control parameter and wherein said wireless device operates according to said at least one control parameter.

8. The system as described in claim 7, wherein said wireless device is registered within an administrative control group.

9. The system as described in claim 8, wherein said at least one control parameter is transmitted with an authentication identifier of said administrator.

10. The system as claimed in claim 7, wherein said at least one control parameter is transmitted via a wireless transmission.

11. The system as described in claim 10, wherein said wireless transmission is at least one of a wireless link, electronic mail transmission, and text messaging transmission.

12. The system as described in claim 7, wherein said at least one control parameter includes at least one of call duration limitation, outgoing calling limitation, incoming call limitation, content access limitation, and message receipt limitation.

13. The system as claimed in claim 12, wherein said at least one control parameter includes a geographic location restriction.

14. A method for remotely controlling a wireless device, comprising:
    (a) receiving at least one control parameter via a transmission;
    (b) recognizing said transmission includes said at least one control parameter, and
    (c) integrating said at least one control parameter within a program of instructions controlling said wireless device, wherein said at least one control parameter is integrated within the program of instructions without compiling the at least one control parameter and said wireless device operates according to said at least one control parameter, said at least one control parameter being a JAVA control instruction integrated within a JAVA applet.

15. The method as described in claim 14, wherein said wireless device is registered within an administrative control group.

16. The method as described in claim 14, further comprising determining whether said at least one control parameter includes an authentication identifier of a designated administrator.

17. The method as claimed in claim 14, wherein said transmission is a wireless transmission.

18. The method as described in claim 17, wherein said wireless transmission is at least one of a wireless link, electronic mail transmission, and text messaging transmission.

19. The method as described in claim 14, wherein said at least one control parameter includes at least one of call duration limitation, outgoing calling limitation, incoming call limitation, content access limitation, and message receipt limitation.

20. The method as claimed in claim 19, wherein said at least one control parameter includes a geographic location restriction.

21. A wireless device capable of being remotely controlled by an administrator, comprising:
  (a) means for receiving at least one control parameter via a wireless transmission, said at least one control parameter including a geographic location restriction, said at least one control parameter being an object variable;
  (b) means for recognizing said wireless transmission includes said at least one control parameter;
  (c) means for integrating said at least one control parameter within a program of instructions controlling said wireless device; and
  (d) means for determining a geographical location, wherein said at least one control parameter is integrated within the program of instructions without compiling the at least one control parameter, said wireless device operates according to said at least one control parameter and said wireless devices notifies an administrator regarding the location of the wireless device.

22. The wireless device as described in claim 21, further comprising means for determining whether said at least one control parameter includes an authentication identifier of a designated administrator.

23. The wireless device as described in claim 21, wherein said wireless transmission is at least one of a wireless link, electronic mail transmission, and text messaging transmission.

24. The wireless device as described in claim 21, wherein said at least one control parameter includes at least one of call duration limitation, outgoing calling limitation, incoming call limitation, content access limitation, and message receipt limitation.

25. The wireless device as described in claim 21, wherein said wireless device is disabled outside of a particular area.

26. The wireless device as described in claim 21, wherein said wireless device sends a message to said administrator when the wireless device exits a boundary.

* * * * *